Dec. 28, 1948.                E. UHLIG                 2,457,419
                          HIGH VOLTAGE BUSHING
                          Filed Oct. 15, 1945

Inventor:
Edward Uhlig,

By Pierce & Scheffler,
                 Attorneys

Patented Dec. 28, 1948

2,457,419

UNITED STATES PATENT OFFICE 2,457,419

HIGH-VOLTAGE BUSHING

Edward Uhlig, Wettingen, Switzerland, assignor to Aktiengesellschaft Brown, Boveri & Cie., Baden, Switzerland Application October 15, 1945, Serial No. 622,403
In Switzerland October 14, 1944

7 Claims. (Cl. 174—151)

It has been found that the alternating flashover voltage at operating frequency between a thin conductor and a plate can be increased to such high values as are otherwise only observed in very homogeneous fields produced by geometrically shaped electrodes. The high stress which is admissible does not only apply to the case where a thin wire is located opposite to a plate-shaped structure but also when the counter-electrode also consists of a thin wire. The same applies when the electrodes consist of a plurality of thin wires and surround each other concentrically.

The present invention concerns a bushing for conductors carrying very high voltages with electrodes which are separated by one or more insulating mediums and control the electric field, whereby according to the invention at least the voltage-carrying electrode is made of thin wires.

Figure 3:
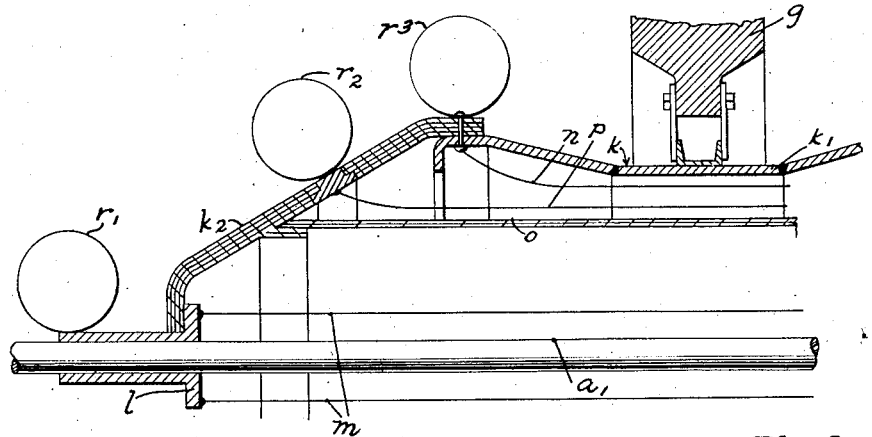
Figure 1:
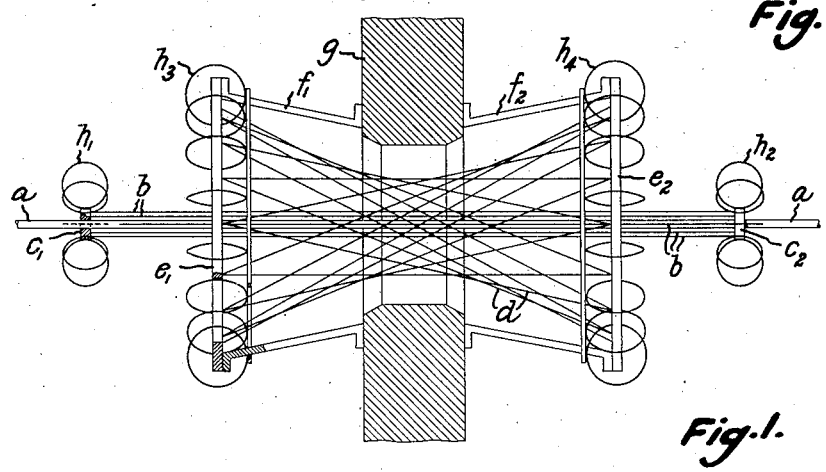
Figure 2:
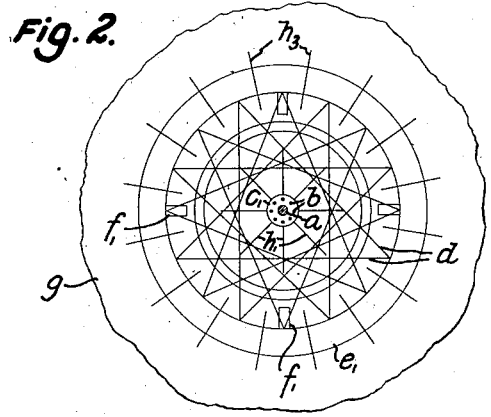

Constructional examples of the invention are shown in the accompanying drawing where Figs. 1 and 2 show a wall bushing in lateral elevation and end view respectively. Fig. 3 is a quarter longitudinal section of a modified form of bushing in which the components are enclosed by a casing.

The inner voltage-carrying electrode comprises a solid or tubular conductor $a$, which has to pass through the wall $g$ and whose cross-section is determined by the current flow, as well as a number of thin parallel wires surrounding the conductor concentrically in the form of a sheath $b$ and stretched between end rings $c_1$, $c_2$. The earthed outer electrode $d$ surrounds the voltage-carrying electrode concentrically and consists of thin wires stretched between annular discs $e_1$, $e_2$. The annular discs $e_1$, $e_2$ are given such a mutual angular displacement in the plane of the discs and fixed to the wall $g$ by supports $f_1$, $f_2$ that a wire structure with the envelope of a hyperboloid results. In order to be able to keep the length of the bushing small the ends of the electrodes $b$ and $d$ are equipped with glow discharge or corona electrodes $h_1$ to $h_4$ for preventing brush discharges and which are constituted by rings made of thin wires fixed like rays to the end rings or discs $c_1$, $c_2$, $e_1$, $e_2$ of the electrodes $b$ and $d$ in radial planes passing through the axis of the latter.

With a bushing constructed in such a manner the opening in the wall can be kept much smaller than with the bushings used hitherto.

The insulating medium between the electrodes of the bushing is assumed to be air in the constructional example described. Instead of air some other gaseous medium at atmospheric pressure or even a higher pressure can also be used, for instance hydrogen, nitrogen, carbon-dioxide. If such gases are used it is necessary that the wire structure of the earthed electrode should be enclosed in a casing $k$ as shown in Fig. 3. This casing is comprised of a central tubular section $k_1$ of conductive material fixed to the earthed wall $g$ and conical insulating end sections $k_2$, which slope towards the conductor $a_1$. Casing $k$ together with conductive bushing $l$ tightly surrounding the conductor $a_1$ at each end of the casing thus form a gas-tight enclosure for the sheath of thin wires $m$ which surround and lie at the same potential as conductor $a_1$ and the outer earthed electrode sheath of thin wires $n$. For comparison purposes, the outer wire electrodes $n$ and the inner wire electrodes $m$ in Fig. 3 correspond to wire electrodes $d$ and $b$ respectively in Figs. 1 and 2. Within casing $k$, the insulating medium does not need to be divided in the radial direction, but it can be subdivided by cylindrical or hyperboloidal surfaces such as the illustrated cylindrical tube $o$ formed from thin layers of solid insulating material arranged concentrically with the conductor axis. The spaces separated by such insulating walls can be filled with different gases or gas mixtures and air. It is also possible to insert layers of solid and liquid insulating materials in a gaseous insulating medium.

In addition to the earthed external electrode and the voltage-carrying inner electrode as illustrated in Figs. 1 and 2, there can also be at least one intermediate electrode arranged concentrically with the axis of the bushing. There can also be several intermediate electrodes. These intermediate electrodes can be surface electrodes or be made entirely or partly of thin wires. In Fig. 3, a single intermediate electrode in the form of a sheath of thin wires $p$ is illustrated. As in the Figs. 1–2 construction, corona rings $r_1$, $r_2$ and $r_3$ of thin wire are connected to the ends of the electrodes $m$, $p$ and $n$, respectively, to prevent brush discharge. Furthermore the intermediate electrodes can be partly or entirely embedded in a solid or liquid insulating medium, so that part of their surfaces or ends are free. The intermediate electrodes can also be located in a gaseous insulating medium.

Bushings made according to the invention are not only suitable as wall bushings but can also be used with high voltage apparatus.

I claim:

1. A bushing for leading a high voltage conductor through an opening in a wall which is at a much lower voltage comprising inner and outer electrode members at the wall opening spaced radially of the conductor for controlling the electrical field around the conductor, said inner electrode member being constituted by a plurality of thin wires spaced parallel and arranged concentrically around the conductor and conductively connected thereto, and said outer electrode member being constituted by a plurality of thin wires forming a cage concentrically about said inner electrode member and conductively connected to said wall.

2. A bushing for leading a high voltage conductor through an opening in a wall which is at a much lower voltage comprising inner and outer electrode members surrounding said conductor at the wall opening for controlling the electrical field around the conductor, said inner electrode being constituted by a plurality of thin wires spaced parallel and arranged concentrically around the conductor and connected thereto, and said outer electrode member being constituted by a plurality of thin wires extending between annular conductive discs secured to opposite faces of the wall and which form a hyperboloidal wire cage.

3. A conductor lead-through bushing as defined in claim 2 and further including corona electrodes secured to the ends of said inner and outer electrode members for preventing brush discharges.

4. A conductor lead-through bushing as defined in claim 3 wherein said corona electrodes are constituted by wire rings arranged in radial planes passing through the axis of said high voltage conductor.

5. A conductor lead-through bushing as defined in claim 2 and which further includes a housing enclosing said conductor and inner and outer electrode members and which contains a gaseous insulating medium at a pressure higher than atmospheric.

6. A conductor lead-through bushing as defined in claim 2 and which further includes a housing enclosing said conductor and inner and outer electrode members, and a tubular insulating sheath arranged concentrically with said conductor intermediate said inner and outer electrode members and subdividing the insulating medium therebetween in a radial direction.

7. A conductor lead-through bushing as defined in claim 2 and which further includes an additional electrode sheath located intermediate said inner and outer electrode members and arranged concentrically therewith.

EDWARD UHLIG.

REFERENCES CITED

The following references are of record in the file of this patent:

UNITED STATES PATENTS

| Number | Name | Date |
|---|---|---|
| 1,350,936 | Peek | Aug. 24, 1920 |
| 1,773,659 | Austin | Aug. 19, 1930 |
| 1,873,798 | Varney | Aug. 23, 1932 |
| 1,945,917 | Scarpa | Feb. 6, 1934 |
| 2,009,854 | Meissner | July 30, 1935 |

FOREIGN PATENTS

| Number | Country | Date |
|---|---|---|
| 568,101 | France | Dec. 17, 1923 |